United States Patent
Tsishkou et al.

(10) Patent No.: US 11,281,941 B2
(45) Date of Patent: Mar. 22, 2022

(54) DANGER RANKING USING END TO END DEEP NEURAL NETWORK

(71) Applicant: IMRA EUROPE S.A.S., Sophia Antipolis (FR)

(72) Inventors: Dzmitry Tsishkou, Juan-les-Pins (FR); Rémy Bendahan, Juan-les-Pins (FR)

(73) Assignee: IMRA EUROPE S.A.S., Sophia-Antipolis (FR)

(*) Notice: Subject to any disclaimer, the term of this patent is extended or adjusted under 35 U.S.C. 154(b) by 38 days.

(21) Appl. No.: 16/213,337

(22) Filed: Dec. 7, 2018

(65) Prior Publication Data

US 2019/0180144 A1    Jun. 13, 2019

(30) Foreign Application Priority Data

Dec. 7, 2017   (EP) .................................. 17206055

(51) Int. Cl.
*G06K 9/62*    (2006.01)
*G06K 9/00*    (2006.01)
(Continued)

(52) U.S. Cl.
CPC ......... *G06K 9/6257* (2013.01); *G05D 1/0214* (2013.01); *G05D 1/0246* (2013.01); *G06K 9/00771* (2013.01); *G06K 9/00791* (2013.01); *G06K 9/00805* (2013.01); *G06N 3/0454* (2013.01); *G06N 3/08* (2013.01); *G01C 21/3667* (2013.01); *G05D 2201/0213* (2013.01)

(58) Field of Classification Search
None
See application file for complete search history.

(56) References Cited

U.S. PATENT DOCUMENTS 62,441,069    *  12/2016  Wheeler
9,760,806 B1     9/2017  Ning et al.
(Continued)

OTHER PUBLICATIONS

Zeng, K.-H., et al., Visual Forecasting by Imitating Dynamics in Natural Sequences, arXiv.org Aug. 19, 2017, http://ai.stanford.edu/-khzerg/projects/vzid, pp. 1-10.
(Continued)

*Primary Examiner* — Fan Zhang
(74) *Attorney, Agent, or Firm* — Kenealy Vaidya LLP

(57) ABSTRACT

A danger ranking training method comprising training a first deep neural network for generic object recognition within generic images, training a second deep neural network for specific object recognition within images of a specific application, training a third deep neural network for specific scene flow prediction within image sequences of the application, training a fourth deep neural network for potential danger areas localization within images or image sequences of the application using at least one human trained danger tagging method, training a fifth deep neural network for non-visible specific object anticipation and/or visible specific object prediction within image or image sequences of the application, and determining at least one danger pixel within an image or an image sequence of the application using an end-to-end deep neural network as a sequence of transfer learning of the five deep neural networks followed by one or several end-to-end top layers.

15 Claims, 5 Drawing Sheets

(51) Int. Cl.
*G05D 1/02* (2020.01)
*G06N 3/04* (2006.01)
*G06N 3/08* (2006.01)
*G01C 21/36* (2006.01)

(56) References Cited

U.S. PATENT DOCUMENTS

| | | | | |
|---|---|---|---|---|
| 10,558,864 | B2* | 2/2020 | Huang | G05D 1/0274 |
| 2007/0047809 | A1* | 3/2007 | Sasaki | G06K 9/00791 |
| | | | | 382/170 |
| 2016/0171316 | A1* | 6/2016 | Fritsch | G06K 9/00791 |
| | | | | 382/104 |
| 2018/0188037 | A1* | 7/2018 | Wheeler | B60W 40/02 |
| 2018/0370502 | A1* | 12/2018 | Wang | G08G 1/166 |
| 2019/0392230 | A1* | 12/2019 | Welland | G06K 9/00845 |

OTHER PUBLICATIONS

Zeng, K.-H., et al., "Agent-Centric Risk Assessment: Accident Anticipation and Risky Region Localization," arXiv:1705.06560v1, May 18, 2017, pp. 1-16.
Sadeghi, F., et al., "CAD2RL: Real Single-Image Flight Without a Single Real Image," arXiv:1611.04201v4, Jun. 8, 2017, pp. 1-12.
Ballan, L., et al., "Knowledge Transfer for Scene-specific Motion Prediction," arXiv:1603.06987v2, Jul. 26, 2016, pp. 1-17.
Bojarski, M., et al., "End to End Learning for Self-Driving Cars," arXiv:1604.07316v1, Apr. 25, 2016, pp. 1-9.
Chen, C.-Y., et al., "Atomic Scenes for Scalable Traffic Scene Recognition in Monocular Videos," IEEE Winter Conference on Applications of Computer Vision (WACV), Lake Placid, NT, USA, 2016, pp. 1-9.
Vondrick, C., et al., "Predicting Motivations of Actions by Leveraging Text," arXIV:1406.5472, Nov. 30, 2016, pp. 1-9.
Vondrick, C., et al., "Generating the Future with Adversarial Transformers," IEEE Conference on Computer Vision and Pattern Recognition (CVPR), 2017, pp. 1-9.
Vu, T.H., et al., "Predicting Actions from Static Scenes," European Conference on Computer Vision (ECCV), 2014, pp. 421-436.
Rummelhard, L., et al., "Probabilistic Grid-based Collision Risk Prediction for Driving Application," ISER, Jun. 2014, Marrakech, Essaouira, Morocco, pp. 1-15.
Lee, N., et al., "DESIRE: Distant Future Prediction in Dynamic Scenes with Interacting Agents," IEEE Conference on Computer Vision and Pattern Recognition (CVPR), 2017, pp. 1-10.
Extended European Search Report for European Patent App. No. 17206055.0 (dated Jun. 15, 2018).

* cited by examiner

DANGER RANKING USING END TO END DEEP NEURAL NETWORK

CROSS REFERENCE TO RELATED APPLICATION(S)

This application claims the priority benefit under 35 U.S.C. § 119 of European Patent Application No. 17206055.0, filed on Dec. 7, 2017, the content of which is hereby incorporated by reference in its entirety.

BACKGROUND

The presently disclosed subject matter generally relates to machine learning techniques and more particularly to deep neural networks (DNN) such as deep convolutional neural networks (CNN) for processing of spatial information and Recurrent Neural Network (RNN)/Long Short Term Memory (LSTM) for processing of temporal information. In particular, the presently disclosed subject matter relates to a danger ranking training method to learn how to detect danger within training images or training image sequences as well as a trained danger ranking method to detect danger within real-time images or real-time image sequences.

Such method is useful especially in the field of human-assisted or autonomous vehicles using sensors for obstacle detection and avoidance, to navigate safely through its environment.

BACKGROUND

The publication of Chen et al., entitled "Atomic Scenes for Scalable Traffic Scene Recognition in Monocular Videos", discloses a system composed of four major components: object recognition, traffic scene recognition, prediction of driving situation related to particular object (such as sudden stop of a lead vehicle for example) and motion planning to propose a safe path (http://www.nec-labs.com/uploads/images/Department-Images/MediaAnalytics/papers/wacv16_atomicscenes.pdf).

Such system presents the drawback of being essentially a rule-based system decomposed into atomic and high-order levels. It cannot cope with real-world previously unseen driving situations that cannot be explained in terms of rules or combinations of rules. Although, such system attributes predefined danger level to a particular object mainly responsible for potential collisions, while being unable to attribute different danger levels to all or most objects within a driving scene, especially in case of a scene where no serious danger for any of the actors is happening. While such approach of atomic scenes could deliver sufficient accuracy of danger prediction in 90% of daily driving scenarios, it could not cope with rare and previously unseen situations, which are the major sources of failures by humans.

The publication of Bojarski et al., entitled "End to End Learning for Self-Driving Cars" (https://arxiv.org/pdf/1604.07316.pdf) discloses a trained convolutional neural network (CNN) to map raw pixels from a single front-facing camera directly to steering commands.

Such system presents the drawback of automatically learning internal representations of the desired processing steps such as detecting useful road features with only the human steering angle as the training signal; and activation maps could indicate importance of the features and their locations for making decision of vehicle control are. However, without providing danger-related labels such system could not learn generic set of danger related features on its own without human supervision.

The publication of Rummelhard et al., entitled "Probabilistic Grid-based Collision Risk Prediction for Driving Application" (https://hal.inria.fr/hal-01011808/document), discloses a new grid-based approach for collision risk prediction.

Such system cannot cope with estimates of future states related to objects non visible in the scene or efficiently estimate danger level related to visible static objects.

The publication of Zeng et al., entitled "Agent-Centric Risk Assessment: Accident Anticipation and Risky Region Localization" (https://arxiv.org/pdf/1705.06560.pdf), discloses an agent-centric approach to study the accident anticipation and risky region localization tasks.

Such system cannot cope with sparse labels and cannot estimate level of danger in case where is no risky event happening. It can require annotation of a single object and cannot support evaluations of different risk levels for multiple potentially dangerous objects at the same time.

The publication of Zeng et al., entitled "Visual Forecasting by Imitating Dynamics in Natural Sequences", introduces a general framework for visual forecasting, which directly imitates visual sequences without additional supervision (http://ai.stanford.edu/~dahuang/papers/iccv17-vfid.pdf).

Such method presents the drawback of being able to give only semantic keyword as prediction outcome, and it cannot generate dense pixel level map, which can be required for fine-grade danger ranking tasks.

The publication of Lee et al., entitled "DESIRE: Distant Future Prediction in Dynamic Scenes with Interacting Agents" introduces a Deep Stochastic IOC1 RNN Encoder/Decoder framework, DESIRE, for the task of future predictions of multiple interacting agents in dynamic scenes. (http://www.nec-labs.com/uploads/images/Department-Images/MediaAnalytics/papers/cvpr17_futureprediction.pdf).

Such system presents the drawback of only working with visible moving objects with past trajectory of significant duration being available in order to generate future predictions. It cannot be used to predict future states of objects being static or not visible in the scene, so that danger level map if using such prediction as primary input would be incomplete.

The publication of Vondrick et al., entitled "Generating the Future with Adversarial Transformers" (http://carlvondrick.com/transformer.pdf), discloses learning models to generate the immediate future in video.

This paper does not mention the possibility of generating future video and classifying objects in that video to obtain danger map. The described approach could not solve the problem of attributing different danger level to different objects and how to attribute danger level to all or most pixels including those on objects that cannot be recognized.

The publication of Vondrick et al., entitled "Predicting Motivations of Actions by Leveraging Text" (http://carlvondrick.com/intention.pdf), discloses understanding human actions as a key problem in computer vision.

This paper does not mention the possibility of predicting motivations of objects to obtain danger map. Such model would be anyway limited to the objects that could be recognized. Furthermore, location of complex objects such as road will not be determined with high accuracy since labels consider objects at bounding box level.

The publication of Vu et al., entitled "Predicting Actions from Static Scenes", aims to discover action-scene correlation for a large number of scene categories and to use such correlation for action prediction (http://www.di.ens.fr/willow/research/actionsfromscenes/paper/eccv14_actionsfromscenes.pdf).

This paper does not mention the possibility of predicting actions to obtain danger map This model only gives semantic keyword as prediction outcome, thus it cannot be used to generate dense pixel level map, which can be required for fine-level trajectory control.

The publication of Sadeghi et al., entitled "$CAD^2RL$: Real Single-Image Flight Without a Single Real Image" (https://arxiv.org/pdf/1611.04201.pdf) proposes a learning method $CAD^2RL$, which can be used to perform collision-free indoor flight in the real world while being trained entirely on 3D CAD models.

Such system presents the drawback of outputting a free-space probability map that is based only on visible object detection and cannot cope with danger related to future states of the objects.

The publication of Ballan et al., entitled "Knowledge Transfer for Scene-specific Motion Prediction" (https://arxiv.org/pdf/1603.06987v2.pdf) introduces a Dynamic Bayesian Network which exploits a scene specific knowledge for trajectory prediction.

Such method presents the drawback of relying on long-term data acquisition of scenes with moving objects. It cannot cope with sparse labels and dynamic camera motion for collection of training data. It can require prohibitively long time to acquire training data in different situations and cannot cope with static objects or rare events.

SUMMARY

The presently disclosed subject matter aims to address the above-mentioned drawbacks of the related art, and more particularly to propose first a danger ranking training method able to detect a danger within images or image sequences related to any specific application. It also aims to propose a danger ranking training method, using the trained method, to detect danger in real-time images or image sequences related to the specific application and to assess a danger level, i.e. each danger being localized and having homogeneous/consistent level for each application.

A first aspect of the presently disclosed subject matter relates to a danger ranking training method within images or image sequences related to a specific application, including training a first deep neural network (DNN-A) for generic object recognition within generic images, training a second deep neural network (DNN-B) for specific object recognition within images related to the specific application, training a third deep neural network (DNN-C) for specific scene flow prediction within image sequences related to the specific application, training a fourth deep neural network (DNN-E) for potential danger areas localization within images or image sequences related to the specific application using at least one human trained tagging method to capture how human reacts and or analyses environment, and determining at least one danger pixel within an image or an image sequence related to the specific application using an end-to-end deep neural network (E2E DNN-4) as a sequence of transfer learning of the four deep neural networks followed by at least one end-to-end specific layer, and possibly at least one top layer (E2E TL) using a human trained danger tagging method.

Such of danger ranking training method enables to train an end-to-end deep neural network in order to determine within images or image sequences related to a specific application at least one danger pixel, possibly representing the most dangerous pixel in the image or image sequence. Such achievement is possible thanks to the different training steps including generic and specific image recognition, specific scene flow prediction and potential danger areas localization. Indeed, image recognition steps allow the training method to learn how to classify any object and more particularly any object related to the specific application. Scene flow prediction step ensures learning how the objects will move in the environment. Potential danger areas localization step trains the method for learning how human reacts and or analyses environment (for instance in driving scenarios for an automotive application), where some of these scenarios could contain potential danger and human reaction would be specific to it. Thus, we learn how to discriminate between potentially dangerous driving scenes by using human reaction as a tag. Finally, the end-to-end deep neural network (E2E DNN-4) further includes one or several end-to end top layers, which receive the trained features for each previous knowledge. These top layers also learn specific features for its own step of danger ranking as well as re-uses features learned from previous steps. Such end-to-end deep neural network trains the method for learning danger ranking by copying the way how human detects danger areas in a situation represented by the image or image sequence and assesses danger level due to the fact that human-based labels of danger level are collected in systematic way by asking humans to tag danger according to the same level definition of danger protocol for all or most images or image sequences.

Rare event is taken into account by this approach: i.e. by introducing multiple knowledge transfers, it significantly reduces probability of rare event, since on each knowledge level, an event that is rare could be generic for another knowledge level, so that rare event is limited to the very little number of cases where the event is rare at every combination of knowledge levels.

Furthermore, with such training method, it is possible to train each deep neural network (DNN) independently using the same DNN architecture by transferring features from one to another.

Advantageously for the determining step, the training method uses the end-to-end deep neural network (E2E DNN-A-B-C-E) as a sequence of transfer learning of the first, second, third and fourth deep neural networks followed by at least one end-to-end top layer (E2E TL).

Indeed, the number of training samples/labels is one of many important factors for the first DNN so that represents a structured knowledge and it is significantly decreasing for each of the second, third and fourth DNNs until representing an unstructured knowledge. Therefore, such training order of each individual DNN benefits from previous more structured knowledge.

Advantageously, the danger ranking training method further includes training a fifth deep neural network (DNN-D) for non-visible specific object or region anticipation and/or visible specific object or region prediction within image or image sequences related to the specific application; and wherein for the determining step, an end-to-end deep neural network (E2E DNN-5) as a sequence of transfer learning of the five deep neural networks is used. It is possible that, for the determining step, the training method uses the end-to-end deep neural network (E2E DNN-A-B-C-D-E) as a sequence of transfer learning of the first, second, third, fifth and fourth deep neural networks followed by at least one end-to-end top layer (E2E TL).

Training of non-visible objects/regions is useful to predict/anticipate that an object/region will change its state or anticipate its appearance in a future at particular location for particular duration of time, especially in the case of missing labels at object level but with labels at pixel or region level. More generally prediction/anticipation concerns predicting/anticipating at least location, duration of appearance, motion direction, type of shape deformation, selection of target object to which current object/region will likely move to, and any other possible change of state and their combinations. In the particular case where specific objects are limited by the training dataset (which is specific to the application of interest), the objects used in prediction and anticipation step could nevertheless be discovered automatically in a non-supervised way as well as their trajectories from current to future state or kinds of potential state changes.

The training of DNN-D further brings interesting features for non-visible objects/regions and/or visible specific object or region to predict/anticipate location, state, etc. in an image or image sequence.

Training this fifth individual network between the third and fourth perfectly fits in the sequence so as to benefit from previous more structured knowledge.

Advantageously, the danger ranking training method can also include training an end-to-end multi-task learning deep neural network (E2E MTL DNN-1) including a combined knowledge of the end-to-end deep neural network (E2E DNN-5) using a sequence of transfer learning of the five deep neural networks, representing one knowledge block, and at least another deep neural network, representing at least another knowledge block, amongst: (i) any deep neural network (DNN-1) among the first, second, third, fourth or fifth deep neural network, (ii) any end-to-end deep neural network (E2E DNN-2) as a sequence of transfer learning of two deep neural networks among the first, second, third, fourth or fifth deep neural network, (iii) any end-to-end deep neural network (E2E DNN-3) as a sequence of transfer learning of three deep neural networks among the first, second, third, fourth or fifth deep neural network, and (iv) any end-to-end deep neural network (E2E DNN-4) as a sequence of transfer learning of four deep neural networks among the first, second, third, fourth or fifth deep neural network, and wherein for the determining step, the combined knowledge of the end-to-end multi-task learning deep neural network (E2E MTL DNN-1) followed by at least one end-to-end top layer (E2E TL) is used.

The danger ranking training method may possibly also include training an end-to-end multi-task learning deep neural network (E2E MTL DNN-2) including a combined knowledge of the end-to-end deep neural network (E2E DNN-A-B-C-D-E) using a sequence of transfer learning of the first, second, third, fourth and fifth deep neural networks, representing one knowledge block, and at least another deep neural network, representing at least another knowledge block, amongst (i) the first deep neural network (DNN-A), (ii) an end-to-end deep neural network (E2E DNN-A-B) as a sequence of transfer learning of the first and second deep neural networks, (iii) an end-to-end deep neural network (E2E DNN-A-B-C) as a sequence of transfer learning of the first, second and third deep neural networks, and (iv) an end-to-end deep neural network (E2E DNN-A-B-C-D) as a sequence of transfer learning of the first, second, third and fourth deep neural networks, and wherein for the determining step, the combined knowledge of the end-to-end multi-task learning deep neural network (E2E MTL DNN-2) followed by at least one end-to-end top layer (E2E TL) is used.

Such training method presents the advantages of training each knowledge block independently using the same DNN architecture by transferring features from one to another and combining all or most knowledge blocks into a single end-to-end multi-task DNN and share access to high-level features so as to learn danger ranking on pixel level as a combination of multiple knowledges.

Advantageously, all or most pixels in the generic and specific objects are labelled, all objects within the specific scene flows are labelled and all or most potential danger areas are labelled.

According to another aim, a second aspect of the presently disclosed subject matter relates to a danger ranking method within images or image sequences related to a specific application, including providing an image or an image sequence; and drawing a danger-ranking map using a trained danger ranking training method according to the first aspect, wherein the danger-ranking map shows any level of danger within the image or image sequence.

Such method combines sparse/dense labels from multiple human individuals; so that the final trained end-to-end deep neural network recombined all or most such individual human experiences into a single multi-expert experience making it stronger compared to a single human. For example, if some danger labels are coming from a person who always drives in snowy conditions and other labels are coming from a person who drives in dry conditions, the trained combined end-to-end network would be at least as good as both drivers in both conditions at once, while humans can be only good where they have significant experience. In this manner, the end-to-end network recombined and integrated experiences of all or most drivers for all or most driving situations. Such method therefore provides a combined end-to-end deep neural network that takes a single image or time series of images as input and generates danger ranking image map as an output taking into account human danger perception in all or most situations and allowing to estimate danger rank in unrestricted scenarios. As a result, it gives a high-level of autonomy for the trained method.

Advantageously, the danger-ranking map is a danger-ranking pixel level map representative of a level of danger for each pixel within the image or image sequence.

In the same manner, such method provides an end-to-end deep neural network that takes a single image or time series of images as input and generates pixel level danger ranking image map as an output. Further, pixel level danger map is not restricted by quality of sensor to segment the image or image sequences. Moreover, danger ranking pixel level map provides for each image pixel its level of danger (danger ranking) with respect to the current situation (uniform for similar scenes). Having more labels in quantity and having more dense labels increases accuracy of training but also increases data processing and labelling time as well as training time. The proposed approach has proven to be very efficient in estimating danger level by using sparse labels, since the combined end-to-end deep neural network has inherited capacity to be trained using sparse labels and produce dense danger raking maps in real-time driving scenarios.

Advantageously the specific application is an assisted or autonomous vehicle driving system and the danger ranking method can also include capturing an image or an image sequence of the vehicle surroundings with an image sensor unit mounted on the vehicle.

For such application, danger ranking pixel level map provides for each image pixel its level of danger with respect to the current driving situation (uniform for similar driving scenes). Such map is a key element of highly assisted/autonomous driving vehicle control systems that need to realize safe and efficient path planning of trajectory control, especially in case of rare/unique driving scenarios.

Alternatively, the specific application is a control system of a sensitive area, and the danger ranking method can also include capturing an image or an image sequence with at least one video surveillance device installed in or around the sensitive area.

Such sensitive areas are for example intensive care area within a hospital, high security neighbourhood in prison or high security area in nuclear plant, etc.

According to another aim, the presently disclosed subject matter further relates to an assisted or autonomous vehicle driving system including at least one image sensor unit arranged to capture an image or an image sequence of the vehicle surroundings; a processing unit to compute a danger-ranking map according to the second aspect method; and a control unit to control the vehicle driving system based on the danger-ranking map.

Advantageously. the processing unit is further arranged to evaluate the level of danger of the danger-ranking map in comparison to a predetermined danger threshold; and wherein the vehicle driving system can also include at least one of a display unit arranged to display a danger alarm; and a driving unit arranged to plan a safe vehicle path planned to reduce the level of danger; and wherein the control unit is arranged to control the display unit and/or the driving unit when the level of danger is above a predetermined danger threshold.

Such application to an assisted or autonomous vehicle driving system increases the safety of the driving system by taking into consideration any potential danger in the environment in the form of a danger ranking map showing the potential dangerous areas as a human would perceived it including for instance upcoming non-visible objects.

According to another aim, the presently disclosed subject matter further relates to a vehicle network including a plurality of vehicles equipped with assisted or autonomous vehicle driving systems according to claim 12 or 13, wherein the driving system of each vehicle also includes a navigation unit implemented with an adaptive navigation high definition map, wherein said adaptive navigation high definition map includes a danger layer based on the danger-ranking map of at least two vehicles of the vehicle network.

Such vehicle network increases the safety for each vehicle driving system, which benefits from the danger ranking maps of other vehicles of the network.

BRIEF DESCRIPTION OF THE DRAWINGS

Other features and advantages of the presently disclosed subject matter will appear more clearly from the following detailed description of particular non-limitative examples of the presently disclosed subject matter, illustrated by the appended drawings where.

DETAILED DESCRIPTION OF EXEMPLARY EMBODIMENTS

Before describing in more details, the different embodiments of the presently disclosed subject matter, here are a few general statements that will be useful for the understanding of the rest of the description that is mainly describing an application to autonomous car. However, one will understand that the presently disclosed subject matter is perfectly transposable to other specific applications with a control system of a sensitive area such as for example intensive care area within a hospital, high security neighbourhood in prison or high security area in nuclear plant, etc.

An aspect of the presently disclosed subject matter aims to introduce danger ranking pixel level map that provides for each image pixel, its level (i.e. rank) of danger with respect to a current driving situation (uniform for similar driving scenes). Such map is a key element of highly assisted/autonomous driving vehicle control systems that need to realize safe and efficient path planning of trajectory control, especially in case of rare/unique driving scenarios.

Figure 1:
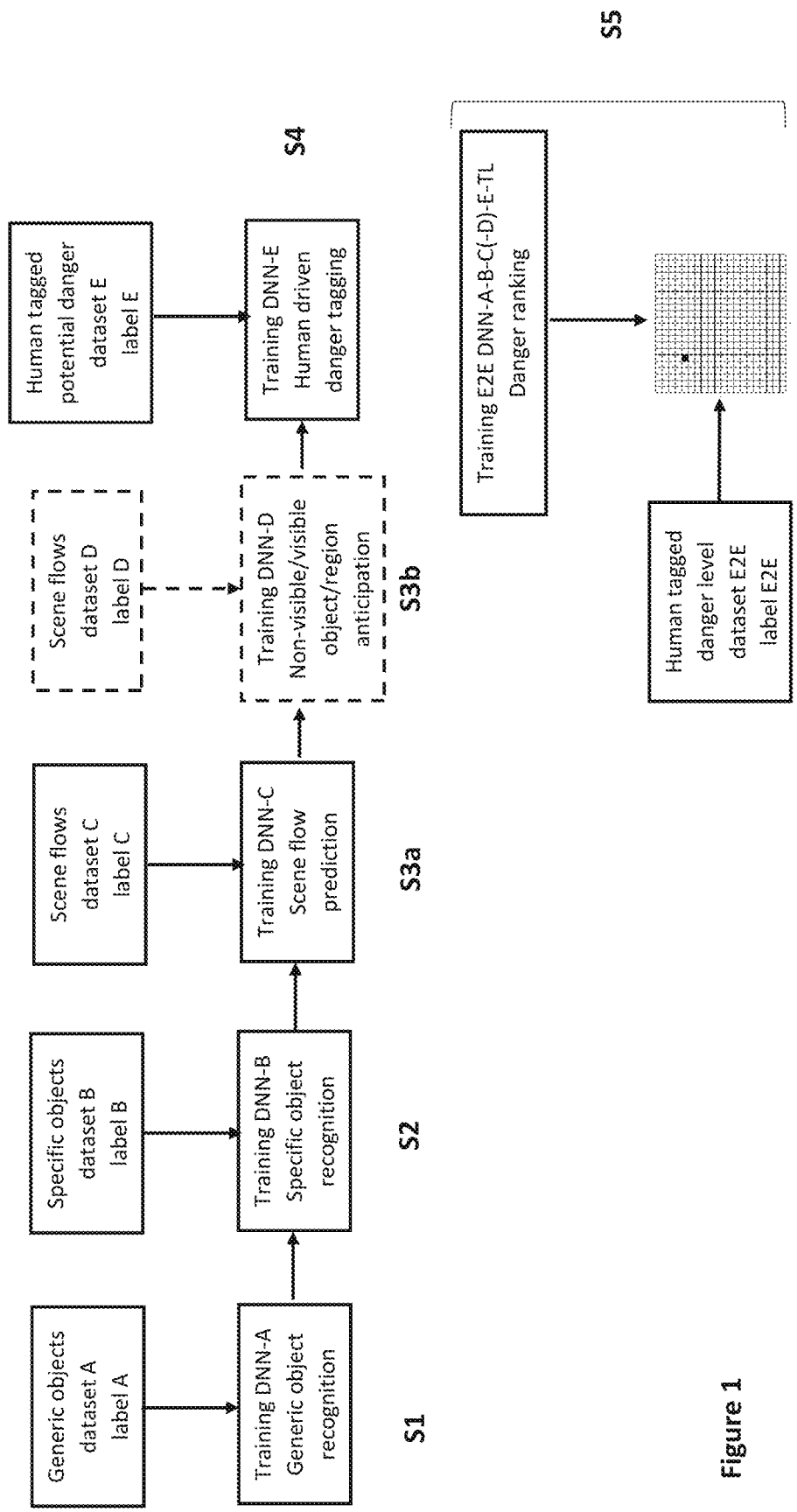
FIG. 1 represents a danger ranking training method according to two possible embodiments of the presently disclosed subject matter.

FIG. 1 represents a danger ranking training method according to two possible embodiments of the presently disclosed subject matter.

Before implementing such danger ranking method into a vehicle driving system, it is key to train such algorithm. For sake of simplicity, the training method represented in FIG. 1 concerns an application to assisted or autonomous car.

According to a first variant, the danger ranking training method includes the steps: S1 of training a first deep neural network (DNN-A) for generic object recognition within generic images, S2 of training a second deep neural network (DNN-B) for specific object recognition within images related to the specific application, S3a of training a third deep neural network (DNN-C) for specific scene flow prediction within image sequences related to the specific application, S4 of training a fourth deep neural network (DNN-E) for potential danger areas localization within images or image sequences related to the specific application using at least one tagging method to capture how human reacts and or analyses environment in driving scenario or situation that reproduces offline or simulates driving scenario, S5 of determining at least one danger pixel within an image or an image sequence related to the specific application using an end-to-end deep neural network (E2E DNN-A-B-C-E-) as a sequence of transfer learning of the first, second, third and fourth deep neural networks followed by one or several end-to-end top layers (E2E TL) using at least one human trained danger tagging method.

According to a second variant, the danger ranking training method also includes a step S3b between steps S3a and S4, the step S3b of training a fifth deep neural network (DNN-D) for non-visible specific object or region anticipation and/or visible specific object or region prediction within image or image sequences related to the specific application.

Consequently, step S5 is adapted as S5 of determining at least one danger pixel within an image or an image sequence related to the specific application using an end-to-end deep neural network (E2E DNN-A-B-C-D-E) as a sequence of transfer learning of the first, second, third, fifth and fourth deep neural networks followed by one or several end-to-end top layers (E2E TL) using at least one human driven danger tagging method.

More particularly, training of each neural network is done by supplying a dataset and labels corresponding to those dataset.

Training of the first deep neural network (DNN-A) for generic object recognition is done by supplying generic images containing generic objects (Dataset-A) and generic object labels (Label-A), and outputting at least one class-generic feature space (Cony-A) and at least one class-generic decision space (FC-A) used to classify generic objects of the generic images into the generic object labels.

The goal for this first network DNN-A is to learn what makes one object different from another. Such training gives robust low and high level visual features. For the transfer learning, it is able to generate robust and unique response for each object category.

Training of the second deep neural network (DNN-B) for specific object recognition is done by supplying specific images containing at least one specific object (Dataset-B) and specific object labels (Label-B), and outputting at least one class-specific feature space (Cony-B) and at least one class-specific decision space (FC-B) used to classify specific objects of the specific images into the specific object labels.

The goal for this second network DNN-B is to learn to segment images into categories at pixel level. Such training gives knowledge of category and location of specific objects in driving scenes. For the transfer learning, it transfers segmentation of image into repeatable regions of semantic category and driving context priors.

Training of the third deep neural network (DNN-C) for specific scene flow prediction is done by supplying specific image sequences (Dataset-B) containing at least one specific object and specific motion or scene flow labels (Label-C), and outputting at least one class-specific feature space (Cony-C) and at least one class-specific decision space (FC-C) used to predict specific scene flow of the specific image sequences into the specific scene flow labels.

The goal for this third network DNN-C is to learn how to estimate dense optical low and depth map. Such training gives knowledge of moving direction, speed and distance to objects. For the transfer learning, it transfers sensor position independent understanding of observable driving scene.

Training of the fourth deep neural network (DNN-D) for non-visible specific object/action or region prediction or visible specific object/action or region prediction is done by supplying specific images or specific image sequences (Dataset-D) containing at least one specific object, and specific non-visible object labels (Label-D), and outputting at least one class-specific feature space (Conv-D) and at least one class-specific decision space (FC-D) used to anticipate/predict appearance of non-visible or visible specific objects/action or regions on either the specific images or the specific image sequences.

The goal for this fourth network DNN-D is to learn how to predict category of objects, their actions and locations mostly relying on the context. Such training gives knowledge of potential category and location of objects in driving scenes. For the transfer learning, it transfers sensor position independent understanding of predicting driving scene. Object/Action prediction of future state of specific objects leads to classification and localization, which is needed to focus on potentially dangerous image areas without seeing objects in the current driving scene.

Training of the fifth deep neural network (DNN-E) for specific eye-tracking localization of potential danger areas is done by supplying specific image sequences (Dataset-E) containing at least one visible or non-visible specific objects and specific danger tagging labels tagged by human experts (Label-E), and outputting at least one class-specific feature space (Conv-E) and at least one class-specific decision space (FC-E) used to localize potential danger areas within the specific image sequences as taught by human experts.

The goal for this fifth network DNN-E is to copy driver's experience to focus only on few image areas. Such training gives the ability to discriminate important/noticeable objects or regions for each driving scene. For the transfer learning, it transfers an estimate of the level of noticeability for each object or region of the driving scene. In particular, Eye tracking localization is needed to filter out image areas noticeable by people. In particular, automotive eye tracking localization is configured to further filter image areas potentially important for driving.

Training of the end-to-end deep neural network (E2E DNN-A-B-C-D-E) is done by a sequence of transfer learning of the first, second, third, fifth and fourth deep neural networks followed by one or several end-to-end top layers (E2E TL) is done by supplying specific image sequences (Dataset-E2E) containing at least one visible or non-visible specific objects and specific danger tagging labels tagged by human experts (Label-E2E), and determining at least one danger pixel.

The goal for this end-to-end network is to estimate the level of collision risk with each object or region within the driving scene. Such training gives knowledge of a danger ranking map. For the transfer learning, it transfers a single image based pixel-level danger ranking map to be used for instance as input to other time-series deep neural network (LSTM, RNN, etc.). Specific knowledge of danger level ranking and localization is considered to filter image areas important for danger estimation, which are among areas important for driving.

Figure 2:
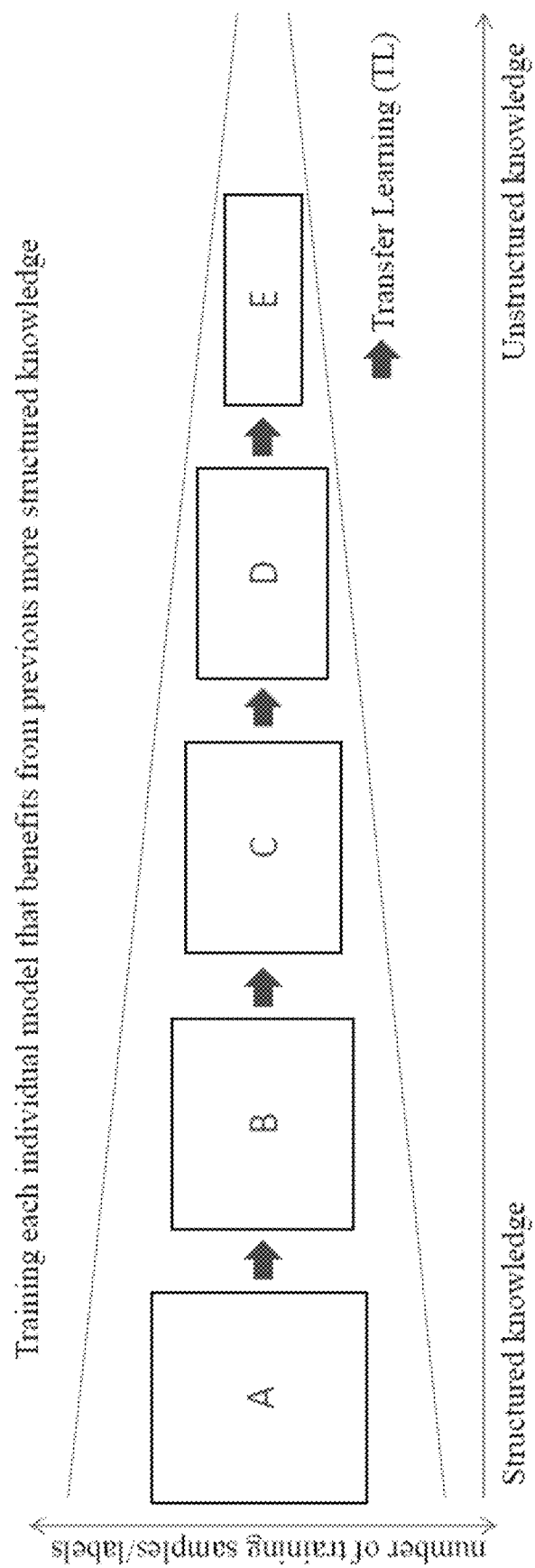
FIG. 2 represents generic flow charts of transfer knowledge learning.

FIG. 2 represents a generic flow chart of transfer knowledge learning applied to the DNN A-E. As it can easily be understood from the graph, the network A has the most structured knowledge and gets a higher number of training samples and labels than the network B, that in turn gets more training samples and labels than the network C, that in turn gets more training samples and labels than the network D that in turn gets more training samples and labels than the network E which has the most unstructured knowledge.

Training each individual model or network A to E benefits from previous more structured knowledge.

For an automotive application, the chosen datasets for training purpose can be for example Dataset-A: ImageNet, Dataset-B: Cytiscapes, Dataset-C: KITTI, Dataset-D: KITTI, Dataset-E: CAT2000 or DriveEye, and E2E dataset: Cytiscapes.

After training, the aim is to embed such method directly in the driving system of an assisted/autonomous car for an automotive application.

Figure 3:
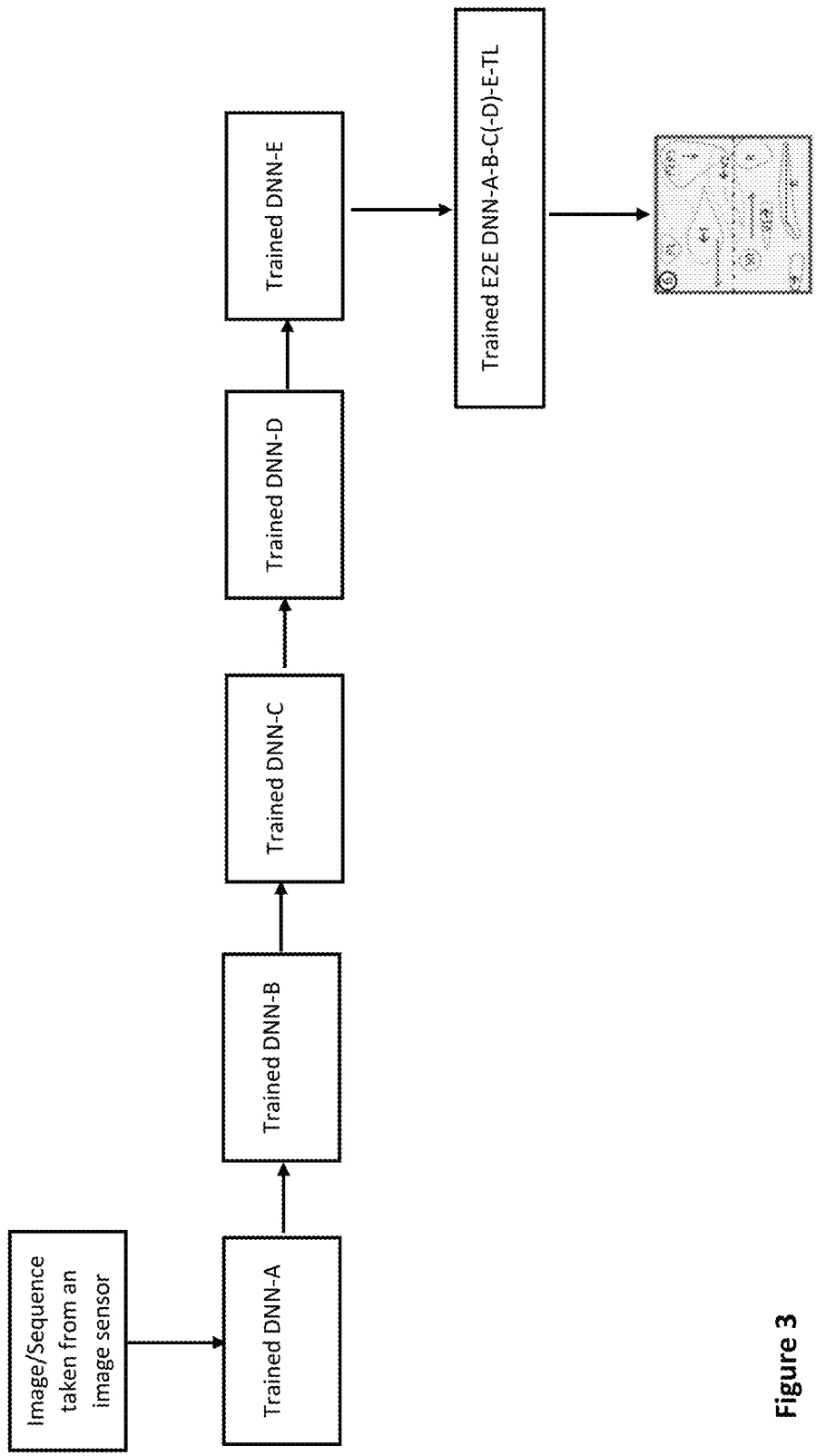
FIG. 3 represents a danger ranking method according to a possible embodiment of the presently disclosed subject matter.

FIG. 3 represents a danger ranking method according to a possible embodiment of the presently disclosed subject matter.

The deep neural networks A to E and E2E differs from the training method only by the fact that they are trained. So that the knowledge transfer is done through the trained end-to-end DNN-A-B-C-D-E-TL that receives input image of driving situation and outputs a pixel level danger map, where each pixel's value corresponds to the rank of danger.

We confirmed that by training end-to-end deep neural network on training data that has only one pixel labeled per image and doing series of transfer it could learn to successfully combine knowledge of object recognition (learned at transfer step) with knowledge of danger (learned at current step, very sparsely labeled data); dense danger ranking map could be obtained by training on very sparse (1 pixel per image) training data, if series of transfer learning steps are used. No need to label all or most pixels with danger—huge speedup of labeling time.

We confirmed that the end-to-end deep neural network is capable of integrating multiple experiences (annotation by same person but within duration of few weeks among tagging various images) into a single solution; it indicates high level of danger for multiple objects within the scene while only one object was annotated per image; combination of data from multiple experts should be feasible as well.

Figure 4:
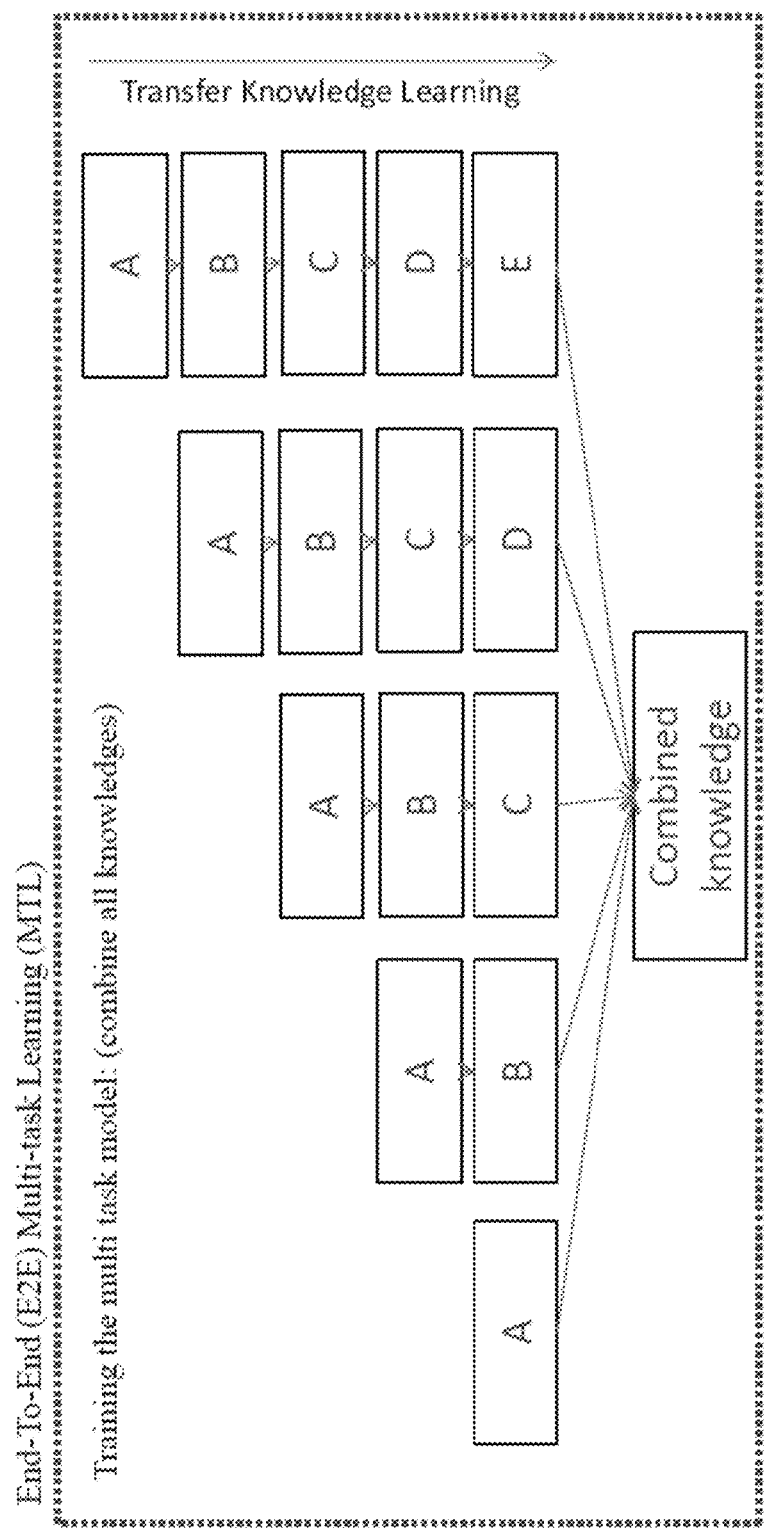
FIG. 4 represents generic flow chart of knowledge combination.

FIG. 4 represents a generic flow chart of knowledge combination according to a possible embodiment of the presently disclosed subject matter.

As it can be easily understood from this figure, by using multi-task training of DNN, one could train danger ranking map by not only giving access to features extracted by end-to-end convolutional part of the network, but also to those extracted by each of the transfer learning blocks in deconvolution part, namely A, A-B, A-B-C, A-B-C-D and A-B-C-D-E. This will allow to benchmark how important each of transfer block for danger ranking is by removing them one by one and comparing multi-task danger ranking accuracy. It should also allow to visualize activation map, which shows locations and strength of connection between multi-task danger ranking and individual transfer learning maps. The stronger the connection is, the more danger ranking relies on the transfer learning map for each particular image pixel. This allows to understand for each image area, from where the danger ranking takes information to make decisions, which combination of transfer learning blocks is strongest in which situation. Such information is highly considerable to constantly improve the danger ranking training method and danger ranking method.

Further, in this manner training process can be reduced up to one individual deep neural network trained using specific or generic knowledge and one end-to-end deep neural network trained to rank danger level of pixels for images or image sequences, similarly the training process can be extended to any reasonable number of sequences of knowledge transfers followed by combined knowledge of the end-to-end multi-task learning deep neural network (E2E MTL DNN-1) followed by at least one end-to-end top layer (E2E TL).

Figure 5:
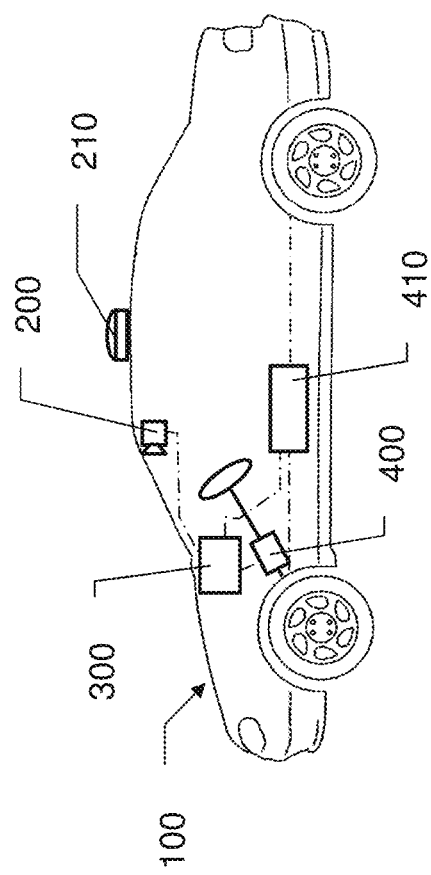
FIG. 5 represents a vehicle equipped with the desired units of this embodiment to implement the method according to the presently disclosed subject matter.

FIG. 5 represents a vehicle equipped with at least one camera 200 pointing the road ahead or the environment of the vehicle to take a video or a continuous series of images (image sequence). The vehicle 100 also includes a processing unit and an electronic control unit (300), a display unit and an autonomous driving unit (400, 410).

The processing unit is arranged to evaluate the level of danger of the danger-ranking map in comparison to a predetermined danger threshold; and the control unit is arranged to control the display unit and/or the driving unit when the level of danger is above a predetermined danger threshold so that the display unit can display a danger alarm and/or the driving unit can plan a safe vehicle path planned to reduce the level of danger.

It will be understood that various modifications and/or improvements evident to those skilled in the art can be brought to the different embodiments of the presently disclosed subject matter described in the present description without departing from the scope of the presently disclosed subject matter defined by the accompanying claims.

The invention claimed is:

1. A danger ranking training method within images or image sequences related to a specific application, comprising:
    training a first deep neural network for generic object recognition within generic images;
    training a second deep neural network for specific object recognition within images related to the specific application;
    training a third deep neural network for specific scene flow prediction within image sequences related to the specific application;
    training a fourth deep neural network for potential danger areas localization within images or image sequences related to the specific application using at least one tagging method to capture a level of danger based on how human reacts and/or analyzes environment in the images or the image sequences; and
    determining at least one danger pixel and a level of danger of the at least one danger pixel within an image or an image sequence related to the specific application using an end-to-end deep neural network as a sequence of transfer learning of the four deep neural networks followed by at least one end-to-end top layer using at least one human trained danger tagging method, wherein
    the at least one human trained danger tagging method includes integrating multiple annotations of an image or an image sequence by a same person tagging the image or image sequence in multiple experiences, and wherein
    levels of danger for multiple objects within images or image sequences are indicated by integrating the at least one human trained danger tagging method on one annotated object.

2. The danger ranking training method according to claim 1, wherein for the determining step, the end-to-end deep neural network as a sequence of transfer learning of the first, second, third and fourth deep neural networks followed by the at least one end-to-end top layer is used.

3. The danger ranking training method according to claim 1, further comprising training a fifth deep neural network for non-visible specific object/action or region anticipation and/or visible specific object or region prediction within image or image sequences related to the specific application,
    wherein for the determining step, an end-to-end deep neural network as a sequence of transfer learning of the five deep neural networks followed by the at least one end-to-end top layer is used.

4. The danger ranking training method according to claim 3, wherein for the determining step, the end-to-end deep neural network as a sequence of transfer learning of the first, second, third, fifth and fourth deep neural networks followed by the at least one end-to-end top layer is used.

5. The danger ranking training method according to claim 3, further comprising training an end-to-end multi-task learning deep neural network comprising a combined knowledge of the end-to-end deep neural network using a sequence of transfer learning of the five deep neural, and at least another deep neural network amongst:
    any deep neural network among the first, second, third, fourth or fifth deep neural network, any end-to-end deep neural network as a sequence of transfer learning of two deep neural networks among the first, second, third, fourth or fifth deep neural network, any end-to-end deep neural network as a sequence of transfer learning of three deep neural networks among the first, second, third, fourth or fifth deep neural network, and any end-to-end deep neural network as a sequence of transfer learning of four deep neural networks among the first, second, third, fourth or fifth deep neural network, and wherein for the determining step, the combined knowledge of the end-to-end multi-task learning deep neural network networks followed by the at least one end-to-end top layer (E2E TL) is used.

6. The danger ranking training method according to claim 4, further comprising training an end-to-end multi-task learning deep neural network including a combined knowledge of the end-to-end deep neural network using a sequence of transfer learning of the first, second, third, fourth and fifth deep neural networks and at least another deep neural network amongst:

the first deep neural network, an end-to-end deep neural network as a sequence of transfer learning of the first and second deep neural networks, an end-to-end deep neural network as a sequence of transfer learning of the first, second and third deep neural networks, and an end-to-end deep neural network as a sequence of transfer learning of the first, second, third and fourth deep neural networks, and wherein for the determining step, the combined knowledge of the end-to-end multi-task learning deep neural network networks followed by the at least one end-to-end top layer is used.

7. The danger ranking training method according to claim 1, wherein pixels in the generic and specific objects are labelled, objects within the specific scene flows are labelled, and potential danger areas are labelled.

8. The danger ranking training method according to claim 1, wherein the at least one human trained danger tagging method further comprises integrating multiple annotations of an image or an image sequence by multiple persons tagging the image or image sequence in multiple experiences.

9. A danger ranking method within images or image sequences related to a specific application, comprising:

providing an image or an image sequence; and drawing a danger-ranking map using a trained danger ranking training method according to claim 1, wherein the danger-ranking map shows any level of danger within the image or image sequence.

10. The danger ranking method according to claim 9, wherein the danger-ranking map is a danger-ranking pixel level map representative of a level of danger for each pixel within the image or image sequence.

11. The danger ranking method according to claim 9, wherein the specific application is an assisted or autonomous vehicle driving system and wherein it further comprises capturing an image or an image sequence of the vehicle surroundings with an image sensor unit mounted on the vehicle.

12. The danger ranking method according to claim 9, wherein the specific application is a control system of a sensitive area and wherein it further comprises capturing an image or an image sequence with at least one video surveillance device installed in or around the sensitive area.

13. An assisted or autonomous vehicle driving system comprising:

at least one image sensor device arranged to capture an image or an image sequence of the vehicle surroundings;

a processor to compute a danger-ranking map according to the method of claim 9; and a controller to control the vehicle driving system based on the danger-ranking maps.

14. The assisted or autonomous vehicle driving system according to claim 13, wherein the processor is further arranged to evaluate the level of danger of the danger-ranking map in comparison to a predetermined danger threshold, and the vehicle driving system includes a display device arranged to display a danger alarm and a driving device arranged to plan a safe vehicle path planned to reduce the level of danger, wherein the controller is arranged to control the display device and the driving device when the level of danger is above a predetermined danger threshold, and wherein the planned safe vehicle path of the driving device is planned based on multiple danger pixels and a respective level of danger of each danger pixel within the danger-ranking map.

15. A vehicle network comprising a plurality of vehicles equipped with assisted or autonomous vehicle driving systems according to claim 13, the driving system of each vehicle further comprising a navigation device implemented with an adaptive navigation high definition map, wherein the adaptive navigation high definition map includes a danger layer based on the danger-ranking map of at least two vehicles of the vehicle network.

* * * * *